May 12, 1942.         J. B. LEE         2,282,660
CORN SLICER, SHREDDER, AND SCRAPER
Filed Dec. 9, 1940
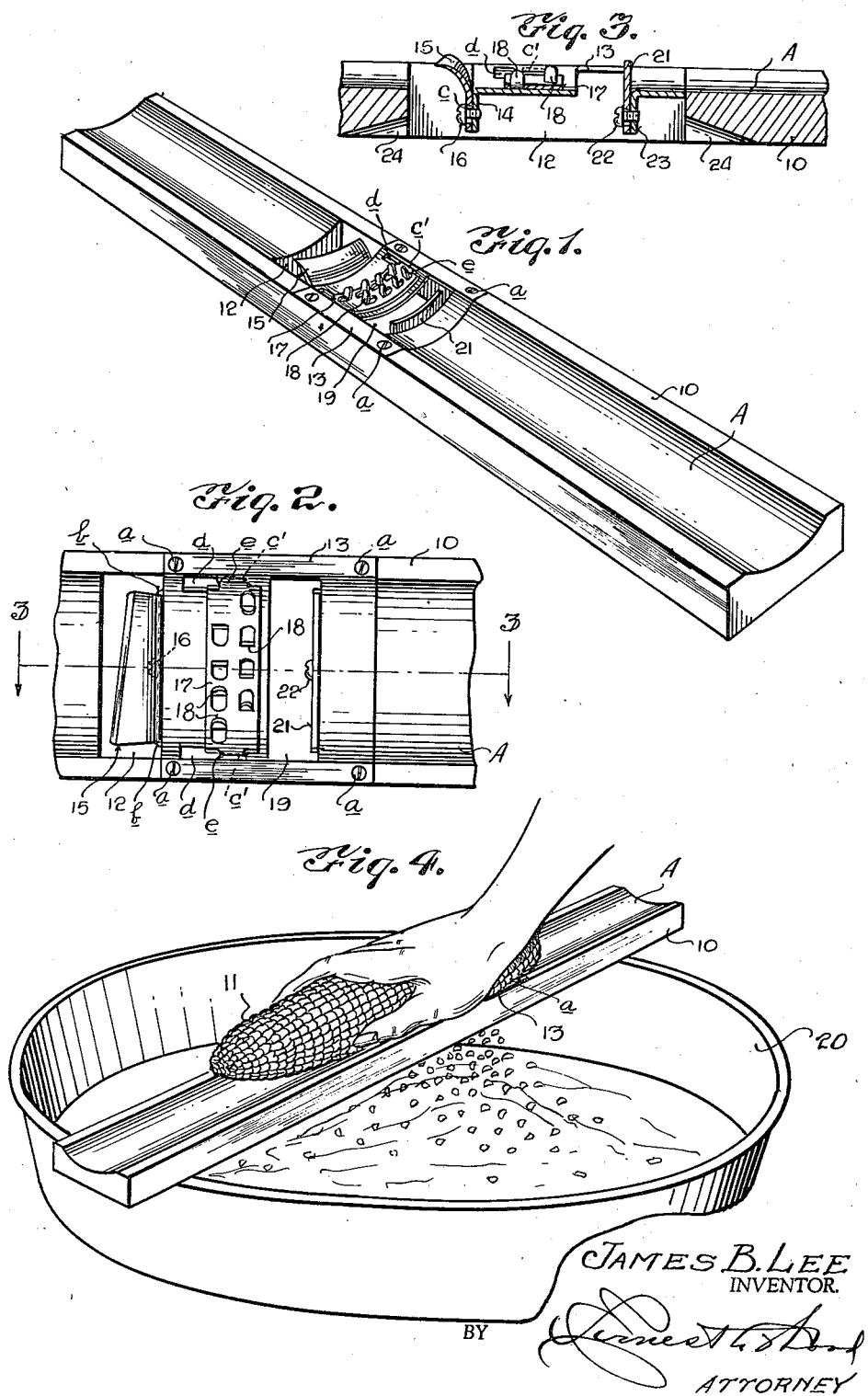
JAMES B. LEE
INVENTOR.
BY
ATTORNEY Patented May 12, 1942

2,282,660

UNITED STATES PATENT OFFICE 2,282,660

CORN SLICER, SHREDDER, AND SCRAPER

James B. Lee, Dallas, Tex.

Application December 9, 1940, Serial No. 369,268

3 Claims. (Cl. 146—4)

This invention relates to utensils for preparing vegetables for cooking and canning and it has particular reference to a slicing and grating utensil for removing grains of fresh corn from the cob for either canning or cooking for immediate consumption.

The principal object of the invention is to afford rapid and efficient means for the slicing of the grain from the cob and extraction of juices therefrom without causing the chaff to be dislodged from the ear, to become mixed with the severed corn, reducing its palatability, which is the case when the corn is removed in the conventional manner as by a common kitchen knife and scraped to release the juices.

Another object of the invention is to provide a device of such simple construction that it may be dismantled and the parts separately cleansed, replaced or repaired and which feature is also predominant in that the cutting blade and scraper may be quickly adjusted to vary the depth of cut and scraping action respectively.

With the foregoing objects as paramount, the invention has particular reference to its salient features of construction and arrangement of parts which will become manifest as the description proceeds, taken in connection with the accompanying drawing, wherein:

Figure 1 is a perspective view of a corn slicer and scraper constructed according to the present invention.

Figure 2 is a fragmentary view of the device but showing a plan view of the cutting, shredding and scraping elements thereof.

Figure 3 is an elevational view in section taken on line 3—3 on Figure 2, and

Figure 4 illustrates a practical application of the invention.

Continuing with a more detailed description of the invention, reference is primarily made to Figure 1 wherein 10 designates an elongated body of wood or metal, provided with a longitudinal groove A of concave form in transverse section to conformably receive an ear of corn 11.

Intermediate the ends and sides of the body 10, a substantially rectangular hole 12 is cut, over a portion of which a plate 13 is secured by means of screws a. This plate extends from one side to the other of the body 10, is concaved to conform to the groove A and is countersunk therein in order that there will be no obstruction to interfere with smooth passage of an ear of corn in the groove or recess A.

The plate 13 is shaped to define a depending tab 14 (Figure 3) having its edges b (Figure 2) turned outwardly to embrace and hold the edges of a slicing blade 15 against displacement. A screw 16 retains the blade in place on the tab 14.

The blade 15 is curved along its major axis, as shown in Figure 1 and its cutting edge is in oblique relationship with the longitudinal axis of the body 10. Moreover, while extending somewhat above the bottom of the groove A, the cutting edge of the blade is likewise curved laterally to conform also with the contour of an ear of corn passed thereover. A slot c is provided in the blade shank through which the retaining screw 16 passes in order that the height of the cutting edge of the blade may be adjusted relative to groove A.

As an ear of corn is passed over the blade 15, the pressure required to slice the grain is necessarily slight so that only the whole grain will be severed leaving the root portion embedded in the cob. As the ear is further moved in the groove A, the remaining root portion of the grain is brought into contact with the shredder 17 which splits the embedded root portions, releasing therefrom the juices, preparatory to the grating or scraping action, to be described presently, which results in the removal of the remaining juices and starchy substance of the grain, leaving only the chaff on the cob.

The shredder 17 is comprised of a strip of metal, curved to conform with the contour of the plate 13 on which it rests and to which it is releasably secured by having its narrowed ends c' placed in apertures d in the plate 13 and urged laterally into slots e which are continuations in fact of apertures d. Thus, the shredder is held against displacement as the corn is urged thereagainst. The shredder is formed by die stamping the strip to form protuberances 18 which are disposed perpendicular to the strip from which they are struck.

Adjacent the shredder 17 the plate 13 is apertured at 19 to provide an opening through which the juices and starchy substance released by the shredder may pass into a receptacle 20 over which the invention is disposed, as shown in Figure 4.

Subsequent to the shredding action, the remaining portion of the grain on the cob is subjected to the action of the scraper 21 which is secured in upright position or right angular relationship with respect to the major axis of the body 10, by means of screw 22 to a depending tab 23, likewise formed by bending downward a portion of the plate 13 along one edge of the opening 19. This scraper plate is likewise slotted at the point through which the retaining screw 22 passes in order that its operative edge may be moved up or down to determine the depth of penetration into the ear, which will be sufficient to remove the remaining food particles from the ear but of insufficient depth to cause dislodgement of the hard particles of the cob which will render the severed grain unpalatable.

As an aid in attaching and detaching the blade 15 from its mounting, a recess 24 is cut in the underside of the body in alignment with the screw 16 to conveniently receive a screw driver or other suitable instrument.

Manifestly, the construction as shown and described is capable of some modification and such modification as may be construed to fall within the scope and meaning of the appended claims is also considered to be within the spirit and intent of the invention.

What is claimed is:

1. A device for slicing, shredding and scraping corn from a cob including an elongated body having a concaved surface along its major axis and provided with an opening intermediate its sides and ends, a slicing blade arranged adjacent to said opening, curved along its major and minor axes and having an oblique cutting edge, means for adjusting said blade relative to the concaved surface of said body, a shredder removably disposed rearwardly of said blade and means likewise adjustably disposed rearwardly of said shredder for scraping the remaining corn from said cob as the same is passed thereover.

2. A corn slicer, shredder and scraper comprising an elongated, longitudinally concaved body having an opening therein intermediate its sides and ends, an apertured plate curved to conform to the concave of said body and secured across said opening, a corn slicing blade mounted on one end of said plate whose cutting edge is in transverse relation to the longitudinal axis of said body and curved along its own major and minor axes, a corn shredder removably disposed on said plate rearwardly of said blade and means likewise adjustably arranged on said plate rearwardly of said shredder for engagement by said cob for scraping therefrom remaining corn.

3. A device for removing fresh corn from a cob comprising an elongated and longitudinally concaved body, having an opening intermediate its ends, an apertured plate conforming to the contour of said body and partially covering the opening in the latter, a slicing blade and scraper mounted for vertical adjustment on either end of said plate, a shredder removably disposed on said plate between said blade and scraper whereby an ear of corn will be successively engaged by said blade, shredder and scraper as the same is moved in the concave of said body.

JAMES B. LEE.